United States Patent [19]

Gorsky

[11] 4,163,035
[45] Jul. 31, 1979

[54] AQUARIUM WATER AERATION DEVICE

[75] Inventor: Egon Gorsky, 306 W. Dudley Ave., Westfield, N.J. 07090

[73] Assignee: Egon Gorsky, Westfield, N.J.

[21] Appl. No.: 869,576

[22] Filed: Jan. 16, 1978

[51] Int. Cl.² .............................................. B01F 3/04
[52] U.S. Cl. ..................................... 261/77; 210/169; 261/124
[58] Field of Search .................. 210/169; 261/124, 77

[56] References Cited

U.S. PATENT DOCUMENTS

| | | | |
|---|---|---|---|
| 3,301,402 | 1/1967 | Falkenberg et al. | 210/169 X |
| 3,321,081 | 5/1967 | Willinger | 210/169 |
| 3,490,700 | 1/1970 | Kern, Jr. | 261/124 |
| 3,511,376 | 5/1970 | Sesholtz | 210/169 |
| 3,513,978 | 5/1970 | Newsteder | 210/169 |
| 3,516,544 | 6/1970 | Sesholtz | 210/169 |
| 3,635,344 | 1/1972 | Loutz | 210/169 |
| 3,717,253 | 2/1975 | Loutz | 210/169 |
| 3,744,635 | 7/1973 | Horrath | 210/169 |
| 3,816,026 | 6/1974 | Isaacson | 210/169 |
| 3,997,634 | 12/1976 | Downs | 261/124 |

*Primary Examiner*—Theodore A. Granger
*Attorney, Agent, or Firm*—Caesar, Rivise, Bernstein & Cohen, Ltd.

[57] ABSTRACT

An aquarium water aeration device including an upper body member having an upwardly extending tubular neck portion with a downwardly depending cylindrical skirt portion and a concentrically disposed wall portion interiorly thereof defining an annulus closed by a lower body member having a collar portion with minute axially extending serrations about the periphery thereof, the collar portion frictionally engaging within the wall portion to define minute air passageways. The annular chamber has an air inlet nipple for receiving air from an air pump, the passage of air through the air passageways directed upwardly relative to a siphon tube to which the device is connected providing a head of water to act as an airlift pump, while providing aeration to the debris-laden fluid from the aquarium into the aquarium filter to which the siphon tube is attached. A grid is connected to the lower portion of the lower body member for limiting the size of particles entering the siphon tube.

10 Claims, 3 Drawing Figures

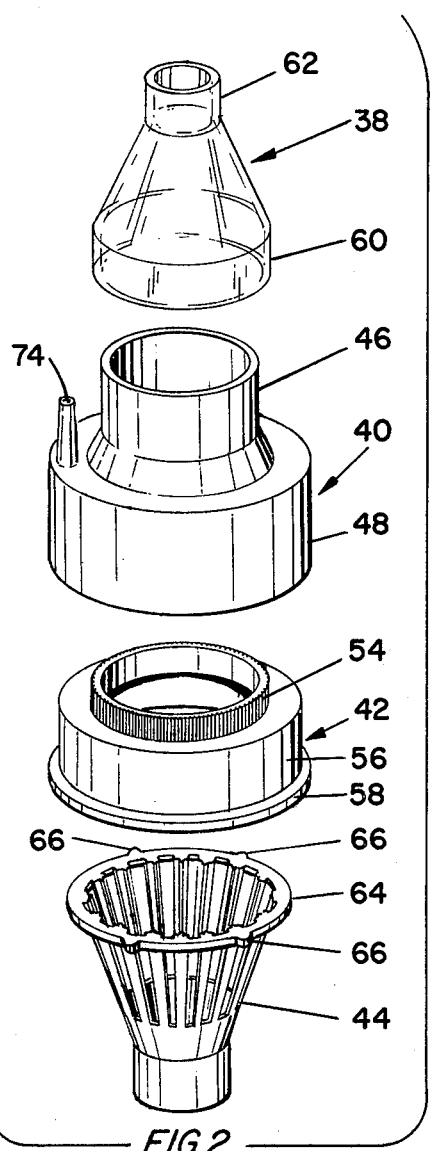
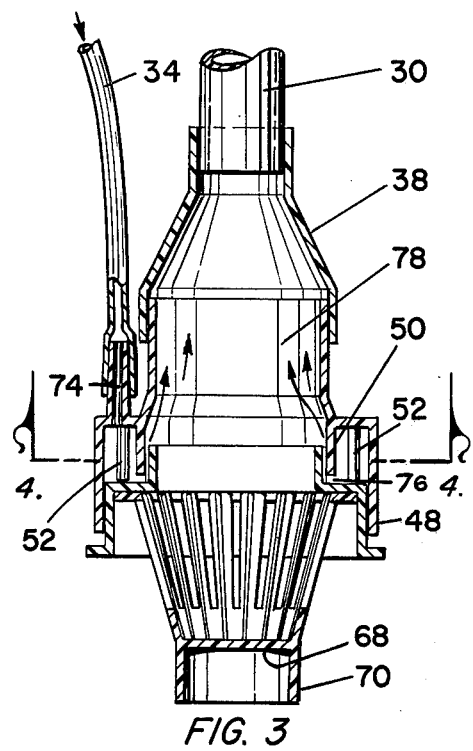
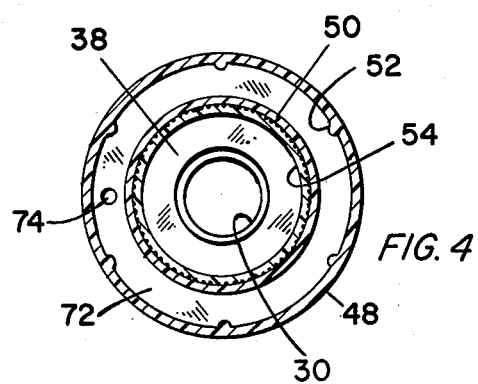
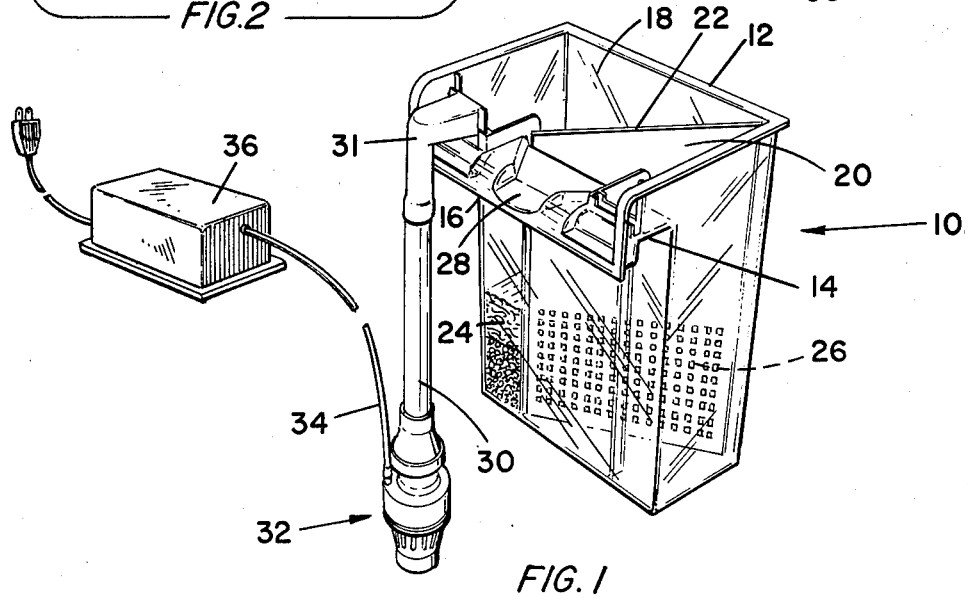
FIG. 2
FIG. 3
FIG. 4
FIG. 1

AQUARIUM WATER AERATION DEVICE

BACKGROUND OF THE INVENTION

The background of the invention will be discussed in two parts:

1. Field of the Invention

This invention relates to aquarium water aeration devices and more particularly to such device for utilization with a siphon tube of an aquarium filter to provide aeration and a head of water to lift water from the aquarium into the filter.

2. Description of the Prior Art

In aquariums, filtration means are provided for removing the debris-laden fluid from the aquarium for passage through suitable filter means to be returned in a cleansed or filtered condition back to the aquarium. In addition to filtration, aeration devices are often times employed to provide minute bubbles of air to the water within the aquarium for oxygenation. For this purpose air stones are often employed for dispersing air from an air pump or the like through a porous stone which divides the air or disperses the air into minute airstreams to generate a large number of miniscule air bubbles, thus providing a source of oxygen to the water.

In U.S. Pat. No. 3,301,402 to Falkenberg, et al, a porous cylindrical body having a hollow core is utilized as a submersible filter wherein air is pumped into the hollow core of the filter to a point adjacent the most deeply submersed portion of the filter thus causing the air to rise within the core to an exit tube, this action drawing the aquarium water through the filter medium.

In U.S. Pat. No. 3,513,978 to Newsteder, an external filter is provided with a bubbling chamber including an air stone through which air passes from an air pump, the upper end of the bubbling chamber being partially covered by a canopy communicating with a tube to convey air bubbles and water entrained thereby from the aerating compartment to the aquarium tank.

Air stones, for aeration purposes, when in constant contact with debris laden fluid within an aquarium, clog frequently due to particles accumulating on the surface thereof, thus diminishing the effectiveness of such air stones. Furthermore, cleaning of air stones is difficult thereby shortening the useful life of such aeration devices.

Accordingly, it is an object of this invention to provide a new and improved aquarium water aeration device.

It is another object of this invention to provide an aquarium water aeration device which can be readily assembled and disassembled for cleaning.

It is a further object of this invention to provide an aquarium water aeration device for connection to the siphon tube of an external aquarium water filter for assisting in starting and maintaining the flow of water from the aquarium to the filter.

SUMMARY OF THE INVENTION

The foregoing and other objects of the invention are accomplished by providing an aquarium water aeration device having an upper body member and a lower body member adapted for interconnection to define a water passage from the aquarium water to an interconnected siphon tube, the upper and lower body members being configured for frictional engagement to define an annular chamber. The upper body member is provided with a depending skirt portion engaged in the outer cylindrical surface of the lower body member which is provided with an upwardly extending collar portion frictionally engageable within a concentrically arranged cylindrical wall portion of the upper body member. The collar portion is provided with minute axially extending serrations about the periphery thereof to provide air passage means. The annular chamber is provided with air inlet means for receiving air from an air pump which passes from the annular chamber through the serrations into the main water passageway to be directly upwardly in the direction of the siphon tube for sparging or agitating the debris-laden fluid within the passageway and to provide a sufficient head of water to lift the water through the tube into the external filter. A grid is provided on the lower opening of the lower body member to limit the size of particle entering.

Other objects, features and advantages of the invention will become apparent from a reading of the specification when taken in conjunction with the drawings in which like reference numerals refer to like elements in the several views.

BRIEF DESCRIPTION OF THE DRAWINGS

FIG. 1 is a perspective view of an external aquarium filter having a siphon tube with the lower end thereof connected to an aquarium water aeration device according to the invention;

FIG. 2 is an exploded perspective view of the aquarium water aeration device of FIG. 1;

FIG. 3 is a cross-sectional view of the aquarium water aeration device of FIG. 1 taken along the axis thereof; and FIG. 4 is a cross-sectional view of the aquarium water aeration device taken generally along line 4—4 of FIG. 3.

DESCRIPTION OF THE PREFERRED EMBODIMENT

Referring now to the drawings and particularly to FIG. 1, there is shown an aquarium filter generally designated 10 of the external filter configuration, the filter 10 having a housing 12 which is generally trough-shaped and provided with a bracket portion 14 configured for resting on the upper edge of an aquarium tank with the downwardly depending lip portion 16 disposed inwardly toward the aquarium water with the housing 12 hanging outside the aquarium tank. The filter 10 is adapted to draw debris-laden aquarium water from an aquarium tank for passage through filtering media before return to the tank. Generally the housing 12 is divided into a debris-laden fluid receiving chamber 18 and a clean water or filtered water chamber 20 which are suitably defined by a filter partition 22. The debris-laden fluid chamber 18 is provided with suitable filtering media 24 for removing particulate matter from the fluid, this so filtered fluid then passing through a perforated portion 26 of partition 22 into the clean water chamber 20 where it passes out through a spillway 28 formed in the upper surface of the bracket portion 14. A siphon tube 30 is connected by means of a suitable coupler 32 to a notched out portion of the housing 12 to admit fluid from the aquarium (not shown) into the chamber 18. The lower end of the siphon tube 30 is coupled to a water aeration device generally designated 32 which is suitably connected by means of a flexible hose 34 to a source of air such as an air pump 36. With the filter 10 in position on the wall of an aquarium tank, the siphon tube 30 and the aquarium water aeration device 32 are disposed beneath the surface of the water within the tank with the flexible tube 34 being connected to the device 32 for connection to the air pump 36 which is disposed externally of the tank. With the air pump operative, as will hereinafter be described, the aeration device 32 acts as a sparger by providing a large number of minute air passages for breaking the main airstream into minute bubbles to serve essentially three different purposes, these being aeration of the water entrained within the passageway of the device 32, agitation of the fluid within the passageway to break up particles, and to provide a head of water sufficient to lift the water from the aquarium through the device 32 and then through the siphon tube 30 into the debris-laden fluid chamber 18 of the housing 12. In this latter respect, the aeration device according to the invention acts as an air lift pump, thus eliminating the necessity for filling the siphon tube with water to commence the siphoning action and likewise to prevent the need for auxiliary devices to commence the siphoning action.

As can be seen in FIG. 2, the aeration device 32 is made up of four components, these being, from top to bottom as viewed in FIG. 2, a transition sleeve 38, an upper body member generally designated 40, a lower body member generally designated 42 and a frusto-conical grid member 44. The upper body member 40 is provided with a tubular neck portion 46 at the upper end thereof with an enlarged diameter cylindrical skirt portion 48 at the lower end thereof. As best illustrated in FIGS. 3 and 4, concentrically disposed within the skirt portion 48 is a reduced length cylindrical wall portion 50, the spacing between wall portion 50 and the inner periphery of skirt portion 48 being in the form of an annulus. The inner surface of the skirt portion 48 within this annulus is provided with a plurality of axially extending equal length ribs 52 which serve as spacers as will hereinafter be described. These ribs are slightly greater in length than the dimension of wall portion 50 within skirt portion 48.

The lower body member 42 is of an inverted generally cup-shaped configuration, the bottom of which is provided with a central opening encircled by a collar portion 54 which is provided about the periphery thereof with a plurality of minute axially extending serrations, the outer diameter of collar 54 being generally equal to the inner diameter of the cylindrical wall portion 50 of the upper body member 40 for frictional engagement therein as depicted in FIG. 3. The main diameter of the inverted cup-shape portion 56 of lower body member 42 is generally equal to the inner diameter of the depending skirt portion 48 for frictional engagement therein. The lower end of the cup-shaped portion 56 is provided with a peripheral flange 58 which facilitates insertion of the lower body member 42 within the upper body member 48 as well as assisting in the separation of the two parts for cleaning. The transition sleeve 38 is in the shape of a funnel, the large diameter of which terminates in a generally cylindrical portion 60 having an inner diameter generally equal to the outer diameter of the tubular neck portion 46 of the upper body member 40 for frictional engagement therewith. The spout end 62 of the transition sleeve 38 has a diameter sufficient for engagement with the siphon tube 30.

The grid member 44 is provided with a generally washer shaped flange shaped portion 64 having a plurality of radially extending tabs 66 about the periphery thereof, the flange portion 64 being configured for a press fit engagement within the cup-shaped portion 56 of the lower body member 42 with the tab 66 engaging the inner periphery thereof with the flange 64 in abutting relation with the planar portion of the cup-shaped portion 56. Integral with the flange portion 64 is a plurality of downwardly and inwardly extending ribs which are in spaced proximate relation to define a grid, the lower end of which may be sealed by an integral disc portion 68 (see FIG. 3), or alternately the disc portion 68 may be provided with an opening of large diameter with a strainer cup positioned over the bottom shell portion 70 of the grid 44. Each of the ribs of the grid is provided with an inwardly directed triangular cross-section, thus providing a plurality of sharp edges on the interior of the frusto-conical grid 44 which assists in breaking up particles entering the device 32 as will hereinafter be described.

As illustrated in FIGS. 3 and 4, with the lower body member 42 frictionally positioned within upper body member 40, an annular chamber 72 is formed, the annular chamber 72 being provided with an air inlet nipple 74 to which the flexible tubing 34 is connected to pass air into the annular chamber 72. As best illustrated in FIG. 3, the configuration of the parts is such that the ribs or spacers 52 have the edges thereof in abutting relation with the planar portion of the cup shape portion 56 of lower body member 42 with the overall height of the cylindrical wall portion 50 being slightly less thereby providing a gap 76 adjacent the inner lower end of the annular chamber 72. With air entering the chamber 72, the air then passes through minute air passage gaps provided by the serrations of collar portion 54 thereby providing a large number of miniscule discrete airstreams entering into the main water passage or chamber 78 formed on the ineterior of the tubular neck portion 46 of the upper body member 40. This airstream is directed upwardly as viewed in FIG. 3 and as indicated by the arrows and in operation, this passage of air draws water from within the aquarium through the openings in the frusto-conical grid 44 through the passageway within collar portion 54 into the chamber or passageway 78 upwardly through the transition sleeve 38 and through the siphon tube 30 into the aquarium chamber 18. During this operation, due to the axially extending serrations about the peripheral collar portion 54, the minute streams of air sparge or agitate the fluid passing through the passageway or chamber 78. With this agitation, the fluid being drawn into the grid 44 is likewise being agitated thereby serving to break-up the particulate matter into smaller particles which can readily be cleansed by the filtering media 24 within the filter housing 12. With an air pump 36 of matched capacity, that is matched to the height of siphon tube 30, the aeration device 32 also provides a sufficient head of water to lift the water from the aquarium the required distance to pass through the siphon tube 30 into the chamber 18. Consequently, in addition to oxygenation or aeration of the fluid passing through the aeration device 32, the agitation provides breaking down of particulate material and the streams of air provide "lift" to enable the device to operate as an air lift pump to convey water into the filter 10.

In accordance with the above-described water aeration device, the air passage means, that is the means for passing the air from the annular chamber 72 has been illustrated to be serrations in the collar portion 54. It is to be understood, however, that the serrations can be provided on the interior of the cylindrical wall portion 50 at the juncture thereof with the collar portion 54. In addition, while the water aeration device 32 has been described with reference to an external filter housing 10, it can likewise be utilized with a filter of the "undergravel" type wherein the entire filter assembly is immersed within the water of the aquarium tank, whereupon the aeration device 32 moves the aquarium water from the portion of the filter beneath the gravel within the aquarium by lifting the water to thereby sparge the same and lift it to a higher elevation for discharge through a discharge tube or spout.

While there has been shown and described a preferred embodiment, it is to be understood that various other adaptations and modifications may be made within the spirit and scope of the invention.

What is claimed is:

1. In combination, a water tube and aerator apparatus comprising a tube having first and second ends and an aerator housing comprising an upper body member and a lower body member, said upper body member including a water chamber therein and connected to said second tube end, said lower body member having water inlet means, said upper body member having an interior wall surface and a first circumferential wall spaced from the interior wall surface and defining an air chamber therebetween, air inlet means in communication with said air chamber, said lower body member of said aerator housing having a second circumferential wall defining a passageway therethrough in communication with said water chamber, said second circumferential wall including a top edge and a surface disposed adjacent to said first circumferential wall of said upper body member to form a large plurality of axially extending air passages communicating with said air chamber and opening into said water chamber contiguous with the top edge of said second circumferential wall, whereupon air pumped into said air chamber passes through said passages to form a large plurality of minute air streams directed axially upward into said water chamber for sparging water therein and moving said water into said tube.

2. The combination of claim 1 wherein said upper body member includes a cylindrical skirt forming said interior wall surface, said first circumferential wall being cylindrical and said air chamber being annular.

3. The combination of claim 2 wherein said upper body member has a tubular neck portion communicating with said water chamber to define a water passage opening, said tubular neck portion being connected to the second end of said tube.

4. The combination of claim 3 further including means interconnecting said tubular neck portion to the second end of the tube.

5. The combination of claim 1 wherein said second wall comprises a cylindrical collar and said air passages comprise minute axially extending serrations disposed about the periphery of said collar.

6. The combination of claim 5 wherein said water chamber and said inlet in said lower body member are aligned for passage of water therethrough.

7. The combination of claim 6 wherein said upper and lower body members are cylindrical in form.

8. The combination of claim 7 wherein said skirt portion includes spacer means on the interior thereof forming a gap for passage of air from said air chamber through said air passages.

9. The combination of claim 8 wherein said spacer means for maintaining said spacing is a plurality of ribs about the inner periphery of said skirt portion.

10. The combination of claim 9 wherein said lower body member comprises grid means disposed over said inlet for limiting the size of particles entering the inlet.

* * * * *